July 11, 1961  K. SCHWARTZWALDER ET AL  2,992,353
SPARK PLUGS
Filed July 9, 1959

INVENTORS
Karl Schwartzwalder,&
BY Raymond E. Schwyn
Paul J. Reising
ATTORNEY

# United States Patent Office 2,992,353
Patented July 11, 1961

2,992,353
SPARK PLUGS
Karl Schwartzwalder, Holly, and Raymond E. Schwyn, Flint, Mich., assignors to General Motors Corporation, Detroit, Mich., a corporation of Delaware
Filed July 9, 1959, Ser. No. 826,007
3 Claims. (Cl. 313—141)

This invention relates to spark plugs and has as one of its objects the provision of a spark plug having an improved electrode material. More specifically, it is an object of the invention to provide the spark plug with an electrode formed of a material having excellent heat and erosion resistance as well as a high heat conductivity.

Figure 1:
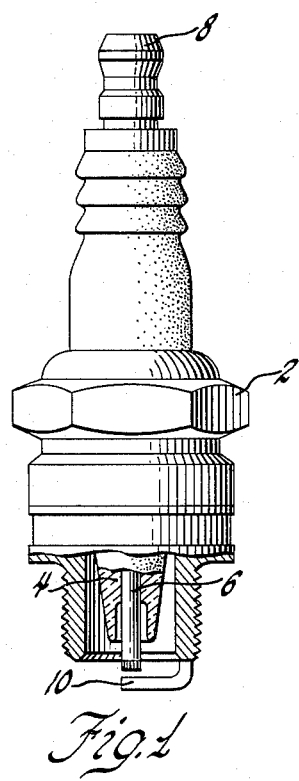
Figure 2:
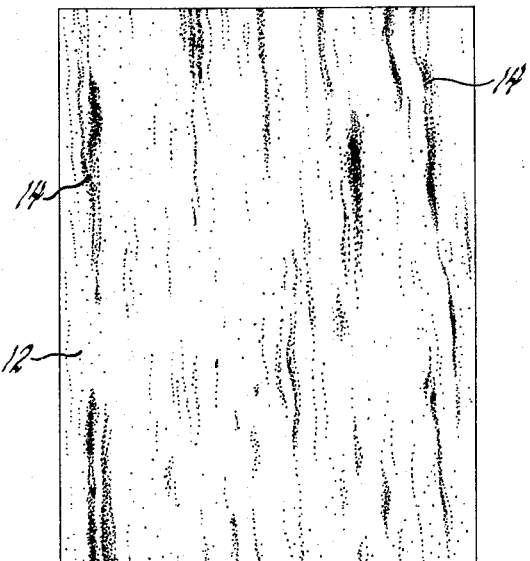

In accordance with the invention, spark plug electrodes are made of a material containing upwards of about 50% (by weight) iron together with chromium in an amount of at least 15%, and about 5% to 20% silver. A minor amount of nickel may also be included though it is not essential. The silver, which is present in the material in its unalloyed state, preferably in the form of elongated stringers which extend axially of the electrode, greatly improves the heat conductivity of the material without detrimental effect on the high heat and erosion resistance of the iron-chromium. Thus the over-all result is an electrode having a very long useful life under spark plug operating conditions. These and other aspects and advantages of the invention will appear more clearly from the following detailed description thereof made with reference to the appended drawing in which:

FIGURE 1 shows a side view in partial section of a spark plug embodying the invention; and FIGURE 2 shows an enlarged diagrammatic view of the metallurgical structure of the electrode in the spark plug shown in FIGURE 1.

Referring now to FIGURE 1, the spark plug shown comprises a conventional metal shell 2 in which there is tightly secured a generally tubular shaped ceramic insulator 4. A center electrode 6, which is secured within the insulator, is electrically connected to the terminal 8 and has a lower tip portion which extends into spaced, spark gap relationship with the ground electrode 10 which is secured by welding to the bottom of the spark plug shell. The present invention relates to the material for both of the electrodes 6 and 10, but finds particular utility in connection with the center electrode in which a high heat conductivity serves to great advantage.

In accordance with the invention the center electrodes 6 consists essentially of from 5% to 20% (by weight) silver, at least 15% and preferably not more than 30% chromium, from 0 to 10% nickel and the remainder, at least 50%, iron. The preferred material contains about 70% iron, 20% chromium and 10% silver. At least a major amount if not all of the iron, chromium and any nickel present will be in alloyed state but most of the silver will occur as such in its unalloyed form. The precise metallurgical structure of the electrode will be best understood from the following description of the preferred method for its manufacture, the method described being basically that covered by copending patent application United States Serial No. 825,998 filed July 9, 1959 in the names of LaVern M. Aurand and Raymond E. Schwyn and assigned to the assignee of the present invention.

About 70 parts by weight of 100 to 325 mesh sponge iron powder is mixed with 20 parts by weight 100 to 325 mesh electrolytic chromium powder and 10 parts by weight 100 to 325 mesh, preferably 250 mesh, silver powder and the mixture pressed into a bar-shaped billet at about 40,000 pounds per square inch pressure. In accordance with conventional practice, a small amount of a suitable lubricant such as hydrogenated cottonseed oil may be included in the raw powder batch to facilitate the pressing operation. After pressing, the billet is sintered in a reducing atmosphere such as hydrogen at about 2000° F. Subsequent to the sintering operation, the bar should preferably be repressed again at about 40,000 pounds per square inch to increase the density and reduce the porosity thereof and then annealed at about 2000° F. in a reducing atmosphere. During these operations, particularly the sintering operation, the iron and chromium will alloy with each other; however, since the silver is relatively insoluble, it will undergo very little alloying and thus will be present as dispersed particles in the sintered product. Subsequently the bar may be swaged cold to a diameter of about $\frac{1}{10}$ inch through a series of dies. Frequent anneals at temperatures of about 1550° F. may be given between swaging passes, the lower temperatures being desirable here to prevent sweating of the silver from the wire as it becomes more dense. After the swaging operation the silver remains as a separate constituent in the wire, it being present now in the form of elongated stringers or fibers which extend longitudinally of the wire. This is shown in FIGURE 2, the iron-chromium alloy being the matrix material 12 and the silver stringers being shown at 14. These stringers 14 serve as a network of very high heat conductivity cores and, hence, the wire itself exhibits a high heat conductivity.

The exact mesh sizes used in the raw powder batch are not critical though the above-recited sizes are desirable in order to obtain the best network of silver stringers in the final product. If it is desired to include nickel in the electrode material, it may be added to the raw powder batch in the quantity desired as 100 to 325 mesh powder. Also, it will be understood that the iron and chromium or the iron, chromium and nickel may be incorporated into the metal powder batch as a previously prepared alloy rather than as separate ingredients. For example an appropriate stainless steel powder may be mixed with the silver powder from which the electrodes may then be made as described above. The choice of temperatures for the sintering and annealing steps will, of course, depend on the exact alloy being used. In general, temperatures on the order of about 1800° F. to 2100° F. are satisfactory in the sintering and initial annealing operations.

After drawing the wire can be cut to the desired length or otherwise shaped as necessary to form the spark plug center electrode. If desired, the wire may be used for the ground electrode 10 though in most types of spark plugs the ground electrode has a very short heat path to the metal shell, and hence an exceptionally high heat conductivity will serve to no great advantage.

In addition to increasing the heat conductivity, the silver also increases to some extent the electrical conductivity of the wire. The silver has no adverse effect on the high erosion resistance and good wear characteristics of the iron-chromium. Thus the invention provides a spark plug having an electrode of high heat conductivity together with excellent spark erosion and corrosion resistance. In addition to providing these improved physical properties, the material has another very important advantage. That is, whereas iron-chromium alloys are extremely difficult to extrude, the electrode material of this invention is easily extruded or otherwise worked. Hence, the material may be used as the outer sheath metal in a composite electrode having a copper or other soft high heat-conductive metal core and made by an extrusion method such as that covered by copending United States patent application Serial No. 686,211, filed September 25, 1957 in the names of Robert W. Smith, Raymond E. Schwyn and Karl Schwartzwalder, and assigned to the assignee of the present invention. It will be understood, therefore, that the invention comprehends a spark plug wherein only a portion of the electrode is of the silver-iron-chromium material as described above, for example, an electrode having an outer sheath of such material and a core of some soft high heat-conductive metal such as copper to thereby further increase the heat conductivity.

While the invention has been described with reference to particular embodiments thereof, changes and modifications may be made, all within the full and intended scope of the claims which follow.

We claim:

1. In a spark plug, the improvement which comprises an electrode having at least a portion consisting essentially of at least about 50% iron, at least about 15% chromium, from about 5% to 20% silver and from 0 to 10% nickel, at least a major portion of said silver being unalloyed and present as a network of stringers extending generally parallel with the longitudinal axis of the electrode.

2. In a spark plug, the improvement which comprises an electrode having at least a portion consisting essentially of at least about 50% iron, from about 15% to 30% chromium, from about 5% to 20% silver and from 0 to 10% nickel, at least a major portion of said silver being unalloyed and present as a network of stringers extending generally parallel with the longitudinal axis of the electrode.

3. In a spark plug, the improvement which comprises an electrode having at least a portion consisting essentially of about 70% iron, about 20% chromium and about 10% silver, at least a major portion of said silver being unalloyed and present as a network of stringers extending generally parallel with the longitudinal axis of the electrode.

References Cited in the file of this patent

UNITED STATES PATENTS

| | | |
|---|---|---|
| 2,406,966 | Pfiel | Sept. 3, 1946 |
| 2,476,208 | Middleton | July 12, 1949 |
| 2,837,679 | Schwartzwalder et al. | June 3, 1958 |

FOREIGN PATENTS

| | | |
|---|---|---|
| 316,252 | Italy | Mar. 30, 1934 |